United States Patent
Ahn

(10) Patent No.: US 9,104,081 B2
(45) Date of Patent: Aug. 11, 2015

(54) LIQUID CRYSTAL DISPLAY DEVICE AND METHOD OF MANUFACTURING THE SAME

(71) Applicant: Hyun Jae Ahn, Yongin (KR)

(72) Inventor: Hyun Jae Ahn, Yongin (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 120 days.

(21) Appl. No.: 13/855,026

(22) Filed: Apr. 2, 2013

(65) Prior Publication Data
US 2014/0139770 A1 May 22, 2014

(30) Foreign Application Priority Data

Nov. 20, 2012 (KR) .......... 10-2012-0131903

(51) Int. Cl.
*G02F 1/1362* (2006.01)
*G02F 1/1333* (2006.01)
*G02F 1/1343* (2006.01)

(52) U.S. Cl.
CPC .... *G02F 1/136286* (2013.01); *G02F 1/133345* (2013.01); *G02F 1/134363* (2013.01); *G02F 2001/134318* (2013.01)

(58) Field of Classification Search
USPC .......................................................... 349/43
See application file for complete search history.

(56) References Cited

U.S. PATENT DOCUMENTS

2005/0078260 A1* 4/2005 Ono et al. .............. 349/141
2010/0051935 A1 3/2010 Lee et al.

FOREIGN PATENT DOCUMENTS

KR 10-2007-0082756 A 8/2007
KR 10-2009-0103499 A 10/2009
KR 10-2010-0025837 A 3/2010

* cited by examiner

*Primary Examiner* — Richard Kim
(74) *Attorney, Agent, or Firm* — Lee & Morse, P.C.

(57) ABSTRACT

A liquid crystal device including an array substrate facing an opposite substrate; and a liquid crystal layer between the array and opposite substrate, the array substrate including a gate electrode and gate line on a base substrate; a gate insulating layer covering the gate electrode and including a trench crossing the gate line; a semiconductor layer on the gate insulating layer and including a channel area overlapping the gate electrode, a source area at one side of the channel area, and a drain area at another side of the channel area; a pixel electrode on the gate insulating layer and spaced apart from the semiconductor layer; a source electrode connected to the source area; a drain electrode connected to the drain area and the pixel electrode; a data line connected to the source electrode and being inside the trench; and a common electrode insulated from the pixel electrode.

14 Claims, 10 Drawing Sheets

LIQUID CRYSTAL DISPLAY DEVICE AND METHOD OF MANUFACTURING THE SAME

CROSS-REFERENCE TO RELATED APPLICATION

This application claims the benefit of Korean Patent Application No. 10-2012-0131903, filed on Nov. 20, 2012, in the Korean Intellectual Property Office, the disclosure of which is incorporated herein in its entirety by reference.

BACKGROUND

1. Field

The embodiments relate to a liquid crystal display device and a method of manufacturing the same.

2. Description of the Related Art

A liquid crystal display device is a device in which a liquid crystal layer is formed between two transparent substrates and can display a desired image by driving the liquid crystal layer to control light transmittance by pixel groups.

The liquid crystal display device may have various display modes depending on an array of liquid crystal molecules. Because of an advantage in a process, a twisted nematic (TN) mode, a patterned vertical alignment (PVA) mode, and an electrically controlled birefringence (ECB) mode may be used. The TN, PVA, and ECB mode liquid crystal display devices are a vertical orientation mode that liquid crystal molecules horizontally oriented with respect to a substrate are almost vertically oriented with respect to the substrate when a voltage is applied.

SUMMARY

Embodiments provide a liquid crystal device. The liquid crystal device may include an array substrate; a opposite substrate facing the array substrate; and a liquid crystal layer disposed between the array substrate and the opposite substrate. The array substrate includes a gate electrode and a gate line disposed on a base substrate; a gate insulating layer covering the gate electrode and including a trench crossing the gate line; a semiconductor layer which is disposed on the gate insulating layer and includes a channel area overlapping the gate electrode, a source area disposed at one side of the channel area and a drain area disposed at the other side of the channel area; a pixel electrode which is disposed on the gate insulating layer and is spaced apart from the semiconductor layer; a source electrode connected to the source area, a drain electrode connected to the drain area and the pixel electrode, and a data line connected to the source electrode; and a common electrode which is insulated from the pixel electrode. The data line is disposed inside the trench.

Embodiments of the inventive concept also provide a liquid crystal device. The liquid crystal device may include an array substrate; a opposite substrate facing the array substrate; and a liquid crystal layer disposed between the array substrate and the opposite substrate. The array substrate includes a gate line; a data line crossing the gate line; an insulating layer disposed between the gate line and the data line; and a pixel connected to the gate line and the data line. The insulating layer comprises a trench which is parallel to the data line and the data line is disposed inside the trench.

Embodiments of the inventive concept also provide a method of manufacturing a liquid crystal device. The method may include preparing an array substrate; preparing a opposite substrate; and disposing a liquid crystal layer between the array substrate and the opposite substrate. Preparing the array substrate includes disposing a gate electrode and a gate line on a base substrate; forming a gate insulating layer covering the gate electrode and the gate line; forming a semiconductor layer of which a part overlaps the gate electrode on the gate insulating layer; forming a pixel electrode disposed to be spaced apart from the semiconductor layer; forming a trench crossing the gate line by patterning the gate insulating layer; forming a source electrode and a drain electrode that are connected to the semiconductor layer and a data line which is connected to the source electrode and is disposed inside the trench; and forming a common electrode insulated from the pixel electrode.

BRIEF DESCRIPTION OF THE FIGURES

Embodiments will be described below in more detail with reference to the accompanying drawings. The embodiments may, however, be embodied in different forms and should not be constructed as limited to the embodiments set forth herein. Rather, these embodiments are provided so that this disclosure will be thorough and complete, and will fully convey the scope of the embodiments to those skilled in the art. Like numbers refer to like elements throughout.

DETAILED DESCRIPTION

Figure 1:
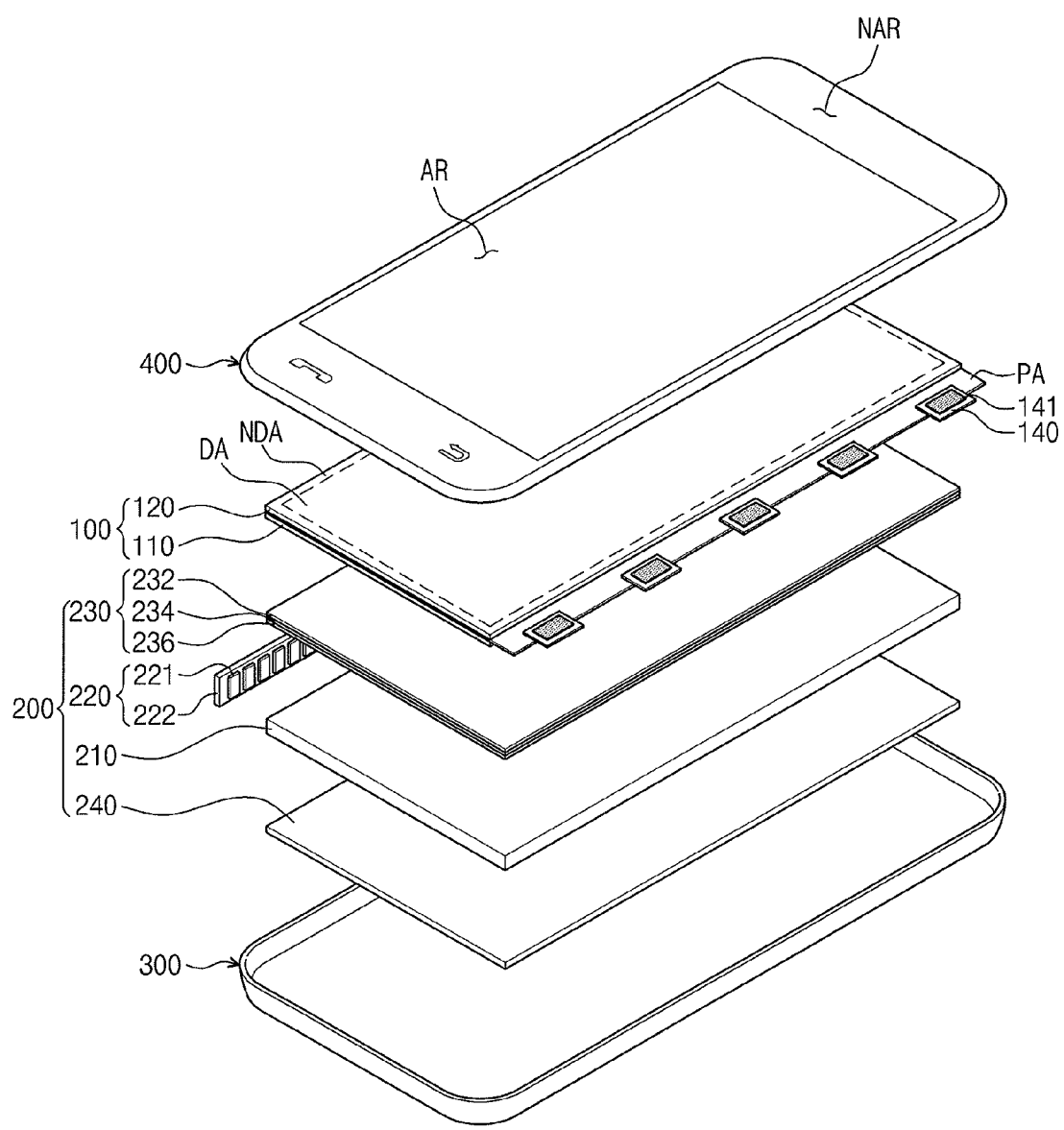
FIG. 1 illustrates an exploded perspective view of a liquid crystal display device in accordance with some embodiments.

Embodiments will be described more fully hereinafter with reference to the accompanying drawings. This embodiments may, however, be embodied in many different forms and should not be construed as limited to the embodiments set forth herein. Rather, these embodiments are provided so that this disclosure will be thorough and complete, and will fully convey the scope of the embodiments to those skilled in the art. In the drawings, the size and relative sizes of layers and regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will also be understood that when an element such as a layer, region or substrate is referred to as being "on" or "onto" another element, it may lie directly on the other element or intervening elements or layers may also be present.

FIG. 1 illustrates an exploded perspective view of a liquid crystal display device in accordance with some embodiments.

Referring to FIG. 1, a liquid crystal display device may include a liquid crystal display panel 100, a backlight unit 200, a housing 300, and a window 400.

The liquid crystal display panel 100 may include a plate of a rectangular shape having a longer side and a shorter side, a display area DA displaying an image, and a non-display area NDA around the display area DA. The liquid crystal display panel 100 may include an array substrate 110, an opposite substrate 120 facing the array substrate 110, and a liquid crystal layer (not shown) formed between the array substrate 110 and the opposite substrate 120. A polarizing film (not shown) may be attached onto both sides of the liquid crystal display device 100, e.g., outer surfaces of the array substrate 110 and the opposite substrate 120.

A plurality of pixels (not shown) arranged in a matrix form may be disposed in the display area DA of the array substrate 110. Each pixel may include a plurality of sub pixels and each sub pixel may have different colors. For example, each sub pixel may have one color of red, green, blue, and white. Thus, light being output from each sub pixel may have one color of red, green, blue, and white. Each pixel may include a gate line (not shown), a data line (not shown) crossing the gate line while being insulated from the gate line, a common electrode (not shown), and a pixel electrode (not shown). Each pixel may include a thin film transistor (not shown) electrically connected to the gate line and the data line and correspondingly and electrically connected to the pixel electrode. The thin film transistor may switch a drive signal being provided to the corresponding pixel electrode.

A sealing pattern (not shown) bonding the array substrate 110 and the opposite substrate 120 may be disposed in the non-display area NDA of the array substrate 110.

A flexible printed circuit board 140 on which a driver IC 141 is mounted may be connected to a pad area PA of the array substrate 110 and the flexible printed circuit board 140 may be connected to an external circuit module (not shown). The driver IC 141 may receive control signals from the external circuit module and may output a drive signal driving the liquid crystal display panel 100 in response to the received control signals to the thin film transistor.

A color filter (not shown) realizing a predetermined color using light being provided from the backlight unit 200 may be provided on one surface of the opposite substrate 120. The color filter may have one color of red, green, blue, and white and may be formed through a deposition process or a coating process. In the present embodiment, the color filter may be formed on the opposite substrate 120 but the embodiments are not limited thereto. The color filter may be formed on the array substrate 110.

The liquid crystal layer may be arranged in a specific direction by a voltage applied to the pixel electrode and the common electrode to control transmittance of light being provided from the backlight unit 200 and thereby the liquid crystal display panel may display an image.

The backlight unit 200 may be disposed in a direction opposite to a direction in which an image is output from the liquid crystal display panel 100. The backlight unit 200 may include a light guide plate 210, a light source unit 220 including a plurality of light sources, an optical member 230, and a reflection sheet 240.

The light guide plate 210 may be disposed below the liquid crystal display panel 100 and may guide light being emitted from the light source unit 220 to output the light toward the liquid crystal display panel 100. The light guide plate 210 may overlap at least the display area DA of the liquid crystal display panel 100. The light guide plate 210 may include a light output surface, a bottom surface facing the light output surface and side surfaces connecting the light output surface and the bottom surface. At least one of the side surfaces may be a light incident surface which light being emitted from the light source unit 220 enter while facing the light source unit 220 and a side surface facing the light incident surface may be a light facing surface reflecting light.

The light source unit 220 may be a type that a plurality of light sources 221, e.g., light emitting diodes, is mounted on a printed circuit board 222. The light sources 221 may emit light of different colors. For example, some parts of the light sources 221 may emit red light, further parts of the light sources 221 may emit green light and the rest of the light sources 221 may emit blue light.

The light source unit 220 may be disposed to emit light while facing at least one of the side surfaces of the light guide plate 210 and may provide light being used when the liquid crystal display panel 100 displays an image through the light guide plate 210.

The optical member 230 may be provided between the light guide plate 210 and the liquid crystal display panel 100. The optical member 230 may control light that is provided from the light source unit 220 and is output through the light guide plate 210. The optical member 230 may include a diffusion sheet 236, a prism sheet 234, and a protection sheet 232 that are sequentially stacked.

The diffusion sheet 236 may diffuse light output from the light guide plate 210. The prism sheet 234 may concentrate light diffused by the diffusion sheet 236 in a direction that is perpendicular to a plane of the liquid crystal display panel 100. Most of light that penetrated the prism sheet 234 may enter the liquid crystal display panel 100 in a direction perpendicular to the liquid crystal display panel 100. The protection sheet 232 may be disposed on the prism sheet 234. The protection sheet 232 may protect the prism sheet 234 from an external impact.

In the present embodiment, the optical member 230 may include one diffusion sheet 236, one prism sheet 234, and one protection sheet 232 but the embodiments are not limited thereto. At least one of the diffusion sheet 236, the prism sheet 234, and the protection sheet 232 may be the plural number and any one sheet may be omitted when desired.

The reflection sheet 240 may be disposed under the light guide plate 210 to reflect light that leaks without being provided in a direction of the liquid crystal display panel 100, thereby changing a light path in a direction of the liquid crystal display panel 100. The reflection sheet 240 may include a material reflecting light. The reflection sheet 240 may be provided on the housing 300 to reflect light emitted from the light source unit 220. As a result, the reflection sheet 240 may increase the amount of light being provided to the liquid crystal display panel 100.

In the present embodiment, the light source unit 220 may be disposed to provide light in a side surface direction of the light guide plate 210 but the embodiments are not limited thereto. For example, the light source unit 220 may be disposed to provide light in a bottom surface direction of the light guide plate 210. Also, the light guide plate 210 may be omitted in the backlight unit 200 and the light source unit 220 may be disposed under the liquid crystal display panel 100 and thereby light being output from the light source unit 220 may be directly provided to the liquid crystal display panel 100.

The window 400 may be disposed on the liquid crystal display panel 100 from which an image is output toward the window 400. The window 400 may be combined with the housing 300 to constitute an outer surface of the liquid crystal display device together with the housing 300.

The window 400 may include a display area AR displaying an image generated from the liquid crystal display panel 100 and a non-display area NAR adjacent to at least part of the display area AR when viewed from a top plan view. The image may not be displayed in the non-display area NAR. At least part of the non-display area NAR may be defined as an input icon area. The input icon area may be activated when the display device operates in a specific mode.

The housing 300 may accommodate the liquid crystal display panel 100. In the present embodiment, a housing constituted by one member having a space that can accommodate the liquid crystal display panel 100 is described as an illustration. The housing 300 may be constituted by two or more members.

The housing 300 may further accommodate a printed circuit board (PCB) on which a plurality of active devices (not shown) and a plurality of passive devices (not shown) are mounted besides the liquid crystal display panel 100. Also, the housing 300 may further accommodate a power supply part (not shown) such as a battery depending on the type of the display device.

Figure 2:
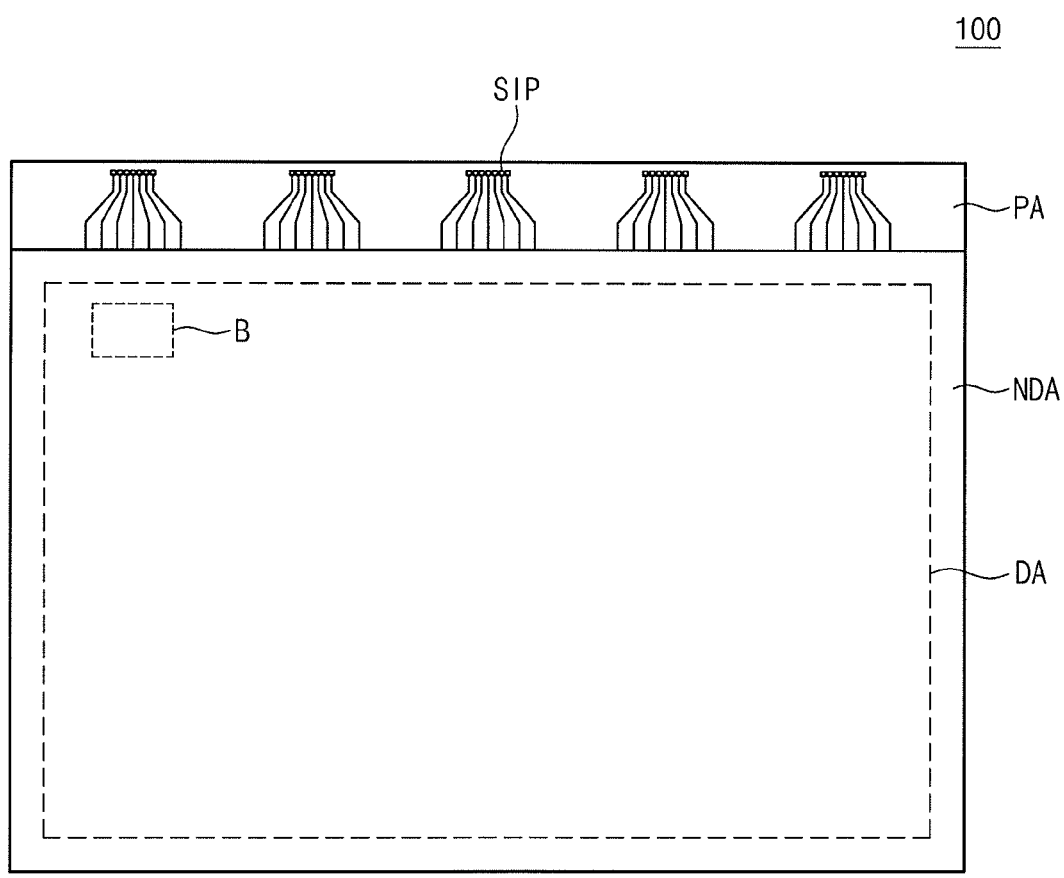
FIG. 2 illustrates a top plan view of a display panel illustrated in FIG. 1.
Figure 3:
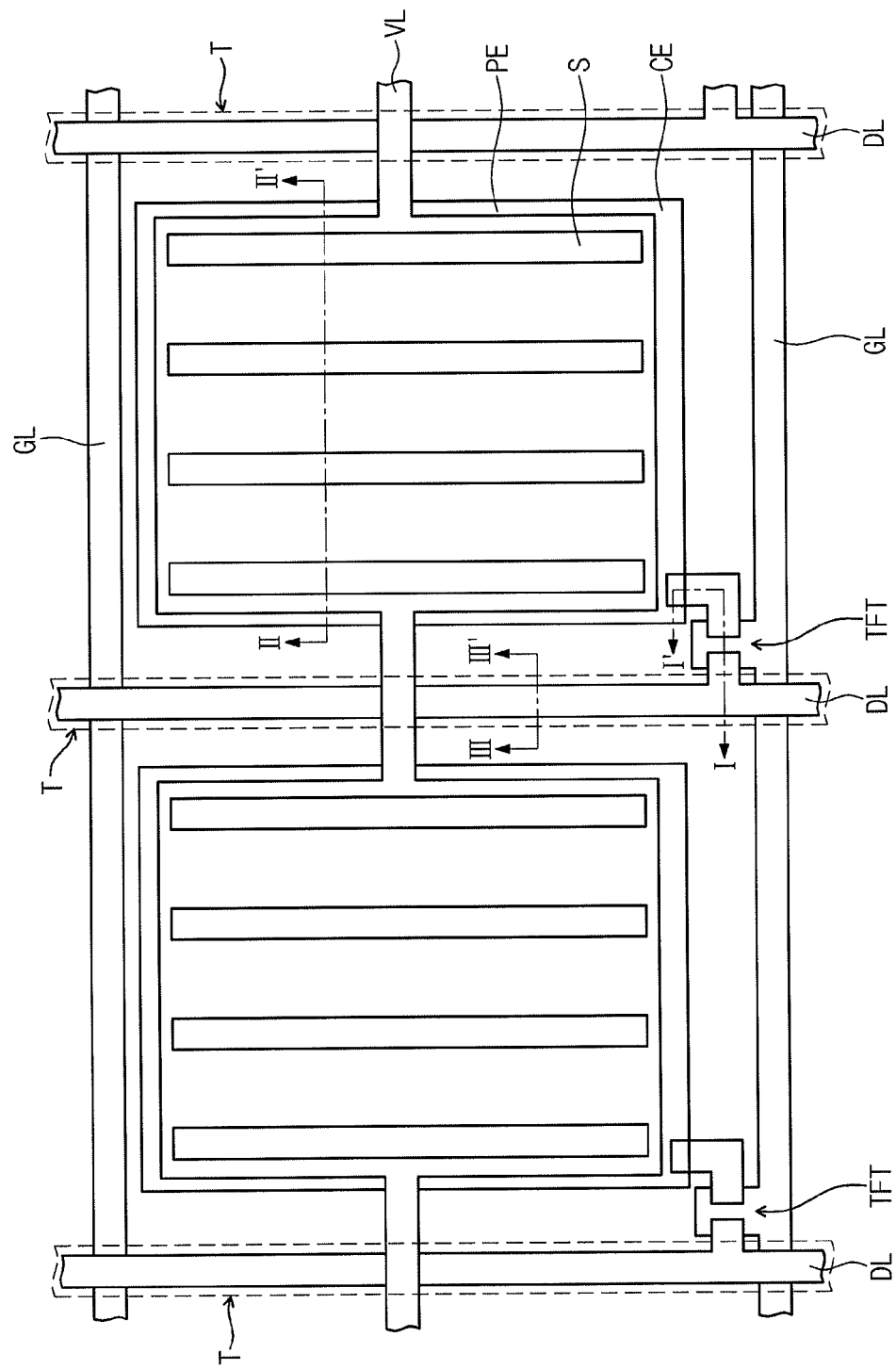
FIG. 3 illustrates an enlarged view of area B in FIG. 2.
Figure 4A:
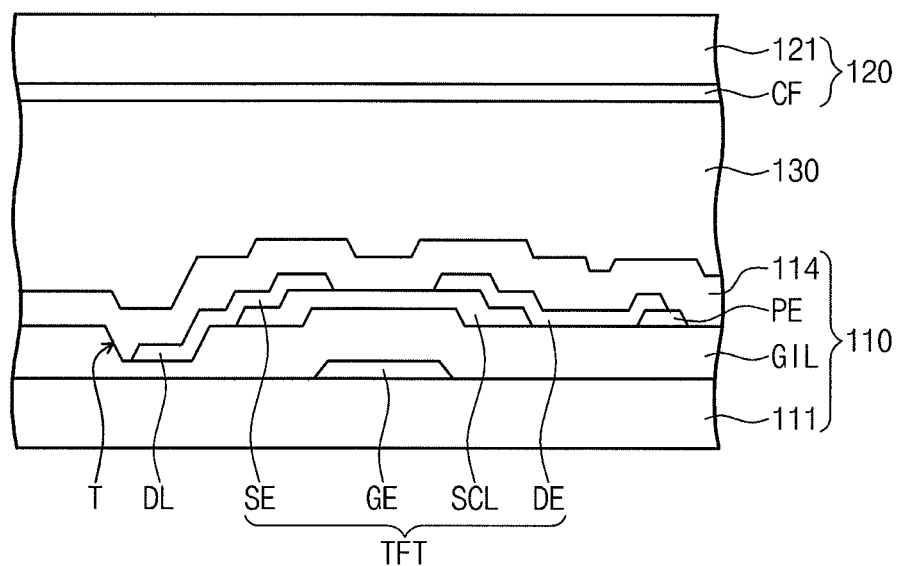
FIG. 4A illustrates a cross sectional view taken along the line I-I' of FIG. 3.
Figure 4B:
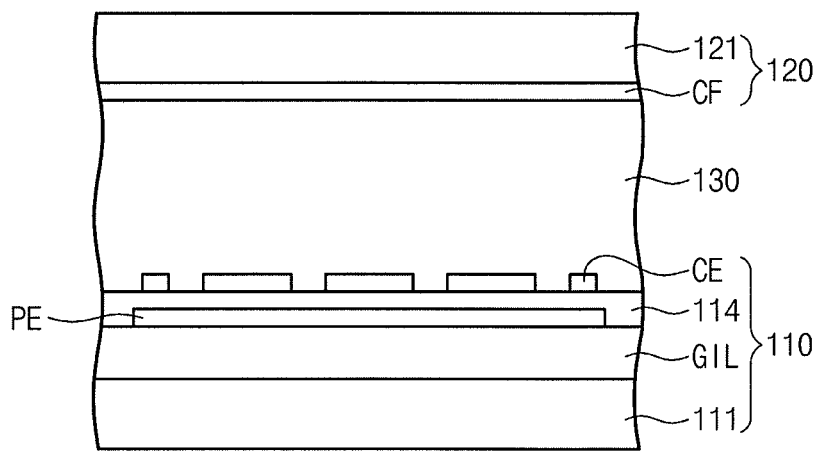
FIG. 4B illustrates a cross sectional view taken along the line II-II' of FIG. 3.
Figure 4C:
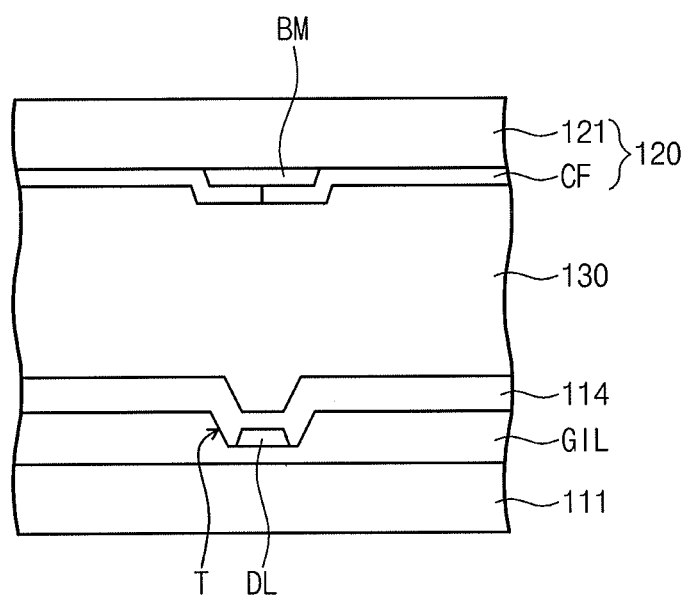
FIG. 4C illustrates a cross sectional view taken along the line III-III' of FIG. 3.

FIG. 2 illustrates a top plan view of a display panel illustrated in FIG. 1. FIG. 3 illustrates an enlarged view of area B in FIG. 2. FIG. 4A illustrates a cross sectional view taken along the line I-I' of FIG. 3. FIG. 4B illustrates a cross sectional view taken along the line I'-II' of FIG. 3. FIG. 4C illustrates a cross sectional view taken along the line III-III' of FIG. 3.

Referring to FIGS. 2, 3, and 4A through 4C, the liquid crystal display panel 100 may include a display area DA displaying an image, a non-display area NDA surrounding the display area DA, and a pad area PA extending from at least one side of the non-display area NDA.

The liquid crystal display panel 100 may include an array substrate 110, an opposite substrate 120 facing the array substrate 110, and a liquid crystal layer 130 disposed between the array substrate 110 and the opposite substrate 120.

The array substrate 110 may correspond to a shape of the liquid crystal display panel 100. Thus, the array substrate 110 may include the display area DA, the non-display area NDA, and the pad area PA.

A plurality of pixels that can realize a color may be arranged in the display area DA of the array substrate 110 in a matrix form. Each pixel may include a thin film transistor TFT, a pixel electrode PE, and a common electrode CE that will be described below.

A sealing pattern (not shown) may be disposed in the non-display area NDA of the array substrate 110. The sealing pattern may be disposed to surround the display area DA. As a result, the array substrate 110 may be bonded to the opposite substrate 120 and the liquid crystal layer 130 may be prevented from leaking to the outside.

A signal input pad SIP connected to the thin film transistor TFT may be disposed in the pad area PA of the array substrate 110.

The array substrate 110 may include a first base substrate 111, the thin film transistor TFT disposed on the first base substrate 111, the pixel electrode PE connected to the thin film transistor TFT, and the common electrode CE to which a common voltage is applied. The first base substrate 111 may be disposed in the display area DA and the non-display area NDA and may be a plate of a rectangular shape having a longer side and a shorter side. The first base substrate may not overlap the pad area PA.

The first base substrate 111 may include a transparent insulation material and thus light may penetrate the first base substrate 111. The first base substrate 111 may be a rigid type substrate or a flexible type substrate. The rigid type substrate may include a glass substrate, a quartz substrate, a glass ceramic substrate, and/or a crystalline glass substrate. The flexible type substrate may include a film substrate and/or a plastic substrate that include a high molecular weight organic matter. It is desirable that a material adopted in the first base substrate 111 has resistance (or heat-resistance) against a high processing temperature when a manufacturing process is performed.

The thin film transistor TFT may be disposed on the first base substrate 111 and may include a semiconductor layer SCL, a gate electrode GE, a source electrode SE, and a drain electrode DE. The thin film transistor TFT may include the gate electrode disposed on the first base substrate 111, a gate insulating layer GIL covering the gate electrode GE, the semiconductor layer SCL disposed on the gate insulating layer GIL, and the source electrode SE and the drain electrode DE that are connected to both ends of the semiconductor layer SCL. The semiconductor layer SCL may include a channel area that overlaps the gate electrode GE on the plane, a source area connected to the source electrode SE, and a drain area connected to the drain electrode DE. The gate electrode GE of the thin film transistor TFT may be connected to a gate line GL transmitting a scan signal or a gate signal to the thin film transistor TFT. The source electrode SE of the thin film transistor TFT may be connected to a data line DL transmitting a data voltage to the thin film transistor TFT.

A thickness of the gate insulating layer GIL may be greater than thicknesses of the source electrode SE, the drain electrode DE, and the data line DL. The gate insulating layer GIL may include a trench T disposed in parallel to the data line DL. A depth of the trench T may be greater than the thicknesses of the source electrode SE, the drain electrode DE, and the data line DL. Thus, the data line DL may be disposed inside the trench T.

The pixel electrode PE is disposed on an upper portion of the gate insulating layer GIL. The pixel electrode PE may include a transparent conductive oxide. For example, the pixel electrode PE may include at least one of Indium Tin Oxide (ITO), Indium Zinc Oxide (IZO), Aluminum Zinc Oxide (AZO), Gallium doped Zinc Oxide (GZO), Zinc Tin Oxide (ZTO), Gallium Tin Oxide (GTO), or Fluorine doped Tin Oxide (FTO).

A protection layer 114 may be disposed on the thin film transistor TFT and the pixel electrode PE. The protection layer 114 may have a multilayer structure in some cases. For instance, the protection layer 114 may include an inorganic protection layer that covers the thin film transistor TFT and that is formed of an inorganic matter and an inorganic protection layer that is disposed on the inorganic protection layer and that is formed of organic matter. The organic protection layer may have a flat surface by removing a step difference generated by the thin film transistor TFT below.

The common electrode CE may be disposed on the protection layer 114. For example, the common electrode CE may be insulated from the pixel electrode PE. The common electrode CE may receive the common voltage through a common power supply line VL. Like the pixel electrode PE, the common electrode CE may include at least one of Indium Tin Oxide (ITO), Indium Zinc Oxide (IZO), Aluminum Zinc Oxide (AZO), Gallium doped Zinc Oxide (GZO), Zinc Tin Oxide (ZTO), Gallium Tin Oxide (GTO), or Fluorine doped Tin Oxide (FTO). The common electrode CE may include a plurality of slits S. The slits S may be parallel to the data line DL. The common power supply line VL electrically connects the common electrodes CE of adjacent pixels.

Any one of the gate line GL and the data line DL, e.g., the data line DL may extend to the pad area PA to be connected to a signal input pad SIP into which an external signal controlling the liquid crystal display panel 100 is input.

The flexible printed circuit board 140 on which a driver IC 141 is mounted may be connected to the signal input pad SIP. The driver IC 141 may receive control signals from an external circuit module to output a drive signal driving the liquid crystal display panel 100 to the thin film transistor TFT through the signal input pad SIP in response to the received all sorts of control signals.

The opposite substrate 120 may be disposed to face the array substrate 110. The opposite substrate 120 may include a second base substrate 121, a color filter CF disposed on a surface of the second base substrate 121 facing the array substrate 10, and a light blocking film BM disposed in a space between adjacent pixels. The second base substrate 121, like the first base substrate 111, may be a rigid type substrate or a flexible type substrate. The color filter CF may have any one color of red, green, and blue.

The liquid crystal layer 130 may include a plurality of liquid crystal molecules. The liquid crystal molecules may be formed of a material having a dielectric anisotropy and a refractive anisotropy. The liquid crystal molecules may be horizontally arranged by a horizontal electric field formed between the common electrode CE and the pixel electrode PE to control transmittance of light. Thus, the liquid crystal layer 130 may penetrate the light being provided from the backlight unit 200 by the electric field and thereby the liquid crystal display panel 100 may display an image.

The liquid crystal display device may have a structure in which a thickness of the gate insulating layer GIL is greater than thicknesses of the source electrode SE, the drain electrode DE, and the data line DL, and the data line DL is disposed inside the trench T. Thus, the data line DL and the common electrode CE may all be disposed on the gate insulating layer GIL but the data line DL may be disposed inside the trench T to prevent the data line DL and the pixel electrode PE from being shorted.

FIGS. 5A through 5C, 6A through 6C, 7A through 7C, and 8A through 8C illustrate cross sectional views of stages in a method of manufacturing a liquid crystal display device in accordance with some embodiments. The method of manufacturing the liquid crystal display device is explained with reference to FIGS. 1, 2, 3, and 4A through 4C.

Figure 5A:
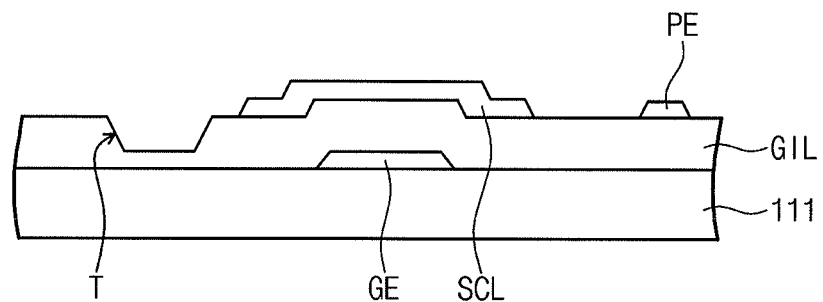
FIGS. 5A through 5C, 6A through 6C, 7A through 7C and 8A through 8C illustrate cross sectional views of stages in a method of manufacturing a liquid crystal display device in accordance with some embodiments.
Figure 5B:
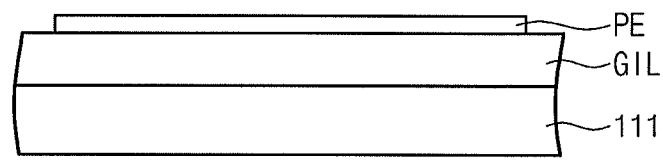
Figure 5C:
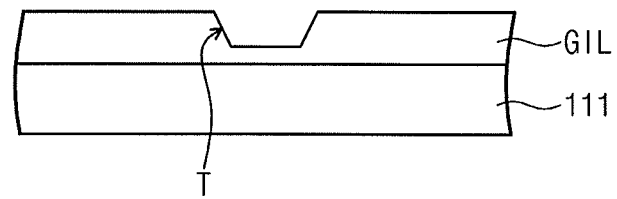

Referring to FIGS. 5A through 5C, a gate electrode GE, and a gate line GL may be formed on a base substrate 111. The gate electrode GE and the gate line GL may be formed by depositing a conductive material on the base substrate 111 and then patterning the deposited conductive material.

After forming the gate electrode GE and the gate line GL, a gate insulating layer GIL covering the gate electrode GE and the gate line GL may be formed. The gate insulating layer GIL may include at least one of silicon oxide or silicon nitride.

After forming the gate insulating layer GIL, a semiconductor layer SCL of which a part overlaps the gate electrode GE may be formed on the gate insulating layer GIL. The semiconductor layer SCL may be formed by depositing amorphous silicon (a-Si) on the gate insulating layer GIL and then patterning the amorphous silicon (a-Si). The semiconductor layer SCL may include a channel area (not shown) that overlaps the gate electrode GE, and a source area and a drain area of both sides of the channel area.

After that, a pixel electrode PE may be formed at an area spaced apart from the semiconductor layer SCL. The pixel electrode PE may include a transparent conductive oxide. For example, the pixel electrode PE may include at least one of Indium Tin Oxide (ITO), Indium Zinc Oxide (IZO), Aluminum Zinc Oxide (AZO), Gallium doped Zinc Oxide (GZO), Zinc Tin Oxide (ZTO), Gallium Tin Oxide (GTO), or Fluorine doped Tin Oxide (FTO).

After forming the pixel electrode PE, the gate insulating layer GIL may be patterned to form a trench T crossing the gate line GL.

Figure 6A:
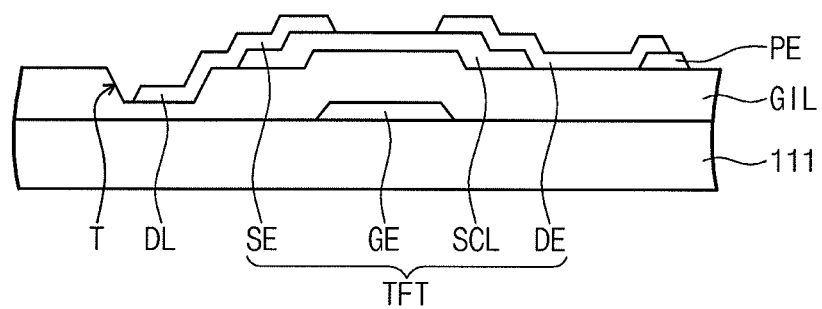
Figure 6B:
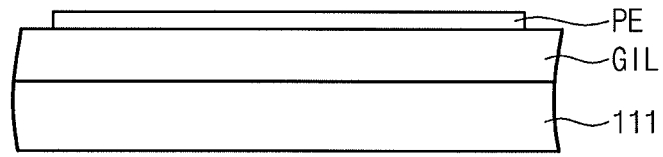
Figure 6C:
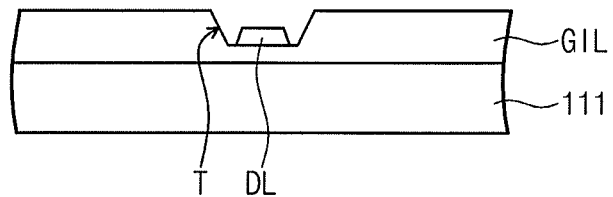

Referring to FIGS. 6A through 6C, after forming the trench T, a source electrode SE connected to the source area, a drain electrode DE connected to the drain area, and a data line DL electrically connected to the source electrode SE may be formed. The drain electrode DE may be connected to the pixel electrode PE without a contact hole. Thicknesses of the source electrode SE, the drain electrode DE, and the data line DL may be smaller than a thickness of the gate insulating layer GIL. Also, thicknesses of the source electrode SE, the drain electrode DE, and the data line DL may be smaller than a depth of the trench T. Thus, the data line DL may be disposed inside the trench T. The data line DL may cross the gate line GL.

Figure 7A:
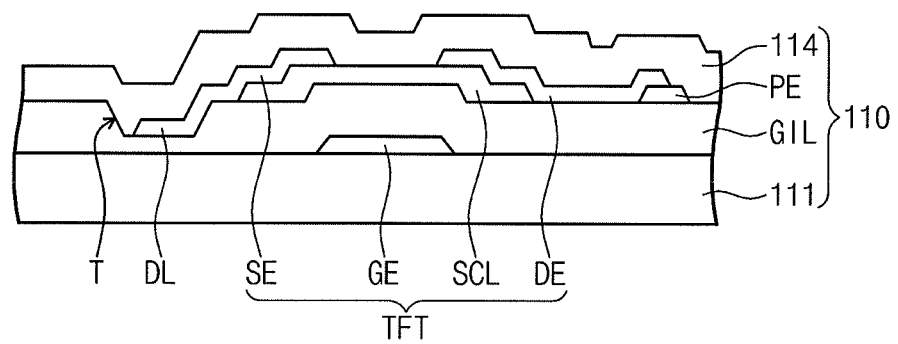
Figure 7B:
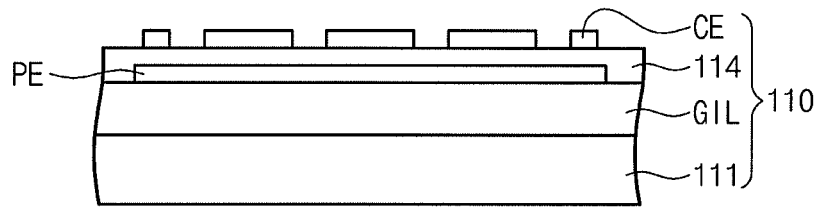
Figure 7C:
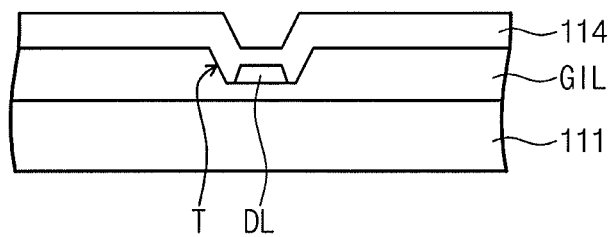

Referring to FIGS. 7A through 7C, after forming the source electrode SE, the drain electrode DE, and the data line DL, a protection layer 114 covering the source electrode SE, the drain electrode DE, and the data line DL may be formed. The protection layer 114 may be an amorphous insulating layer including at least one of silicon oxide or silicon nitride. Also, the protection layer 114 may have a structure in which an inorganic insulating layer and an organic insulating layer are stacked.

After forming the protection layer 114, a common electrode CE may be formed on the protection layer 114 to form an array substrate 110. The common electrode CE, like the pixel electrode PE, may include at least one of Indium Tin Oxide (ITO), Indium Zinc Oxide (IZO), Aluminum Zinc Oxide (AZO), Gallium doped Zinc Oxide (GZO), Zinc Tin Oxide (ZTO), Gallium Tin Oxide (GTO), or Fluorine doped Tin Oxide (FTO).

The common electrode CE may include a plurality of slits. The slits may be parallel to the data line DL.

Figure 8A:
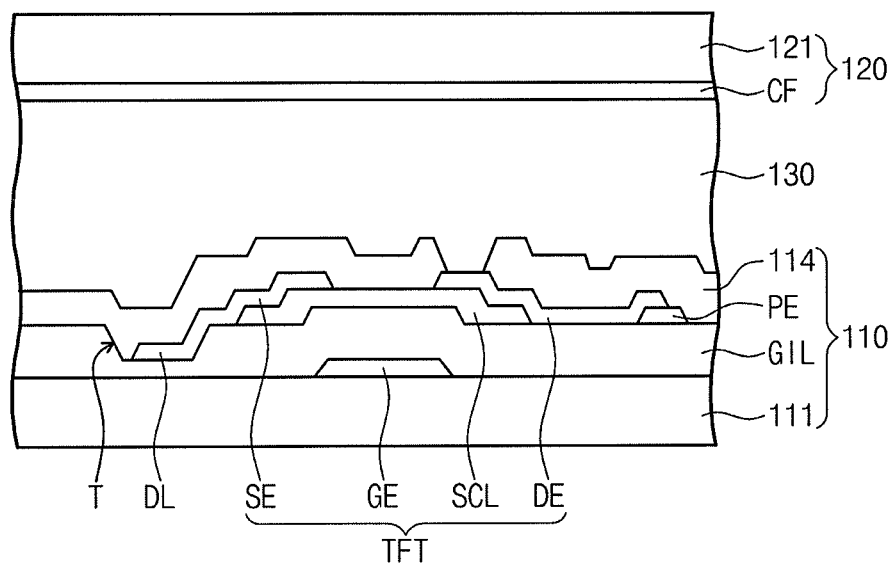
Figure 8B:
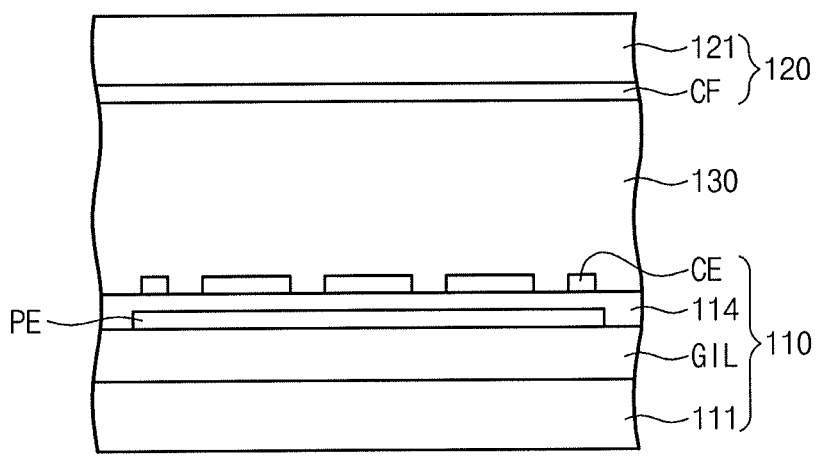
Figure 8C:
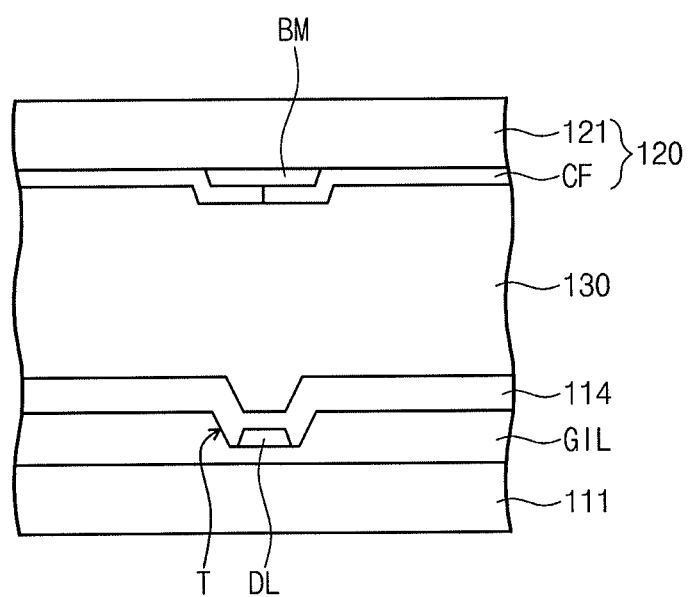

Referring to FIGS. 8A through 8C, after forming the common electrode CE, an opposite substrate 120 may be prepared. The opposite substrate 120 may include a second base substrate 121, a color filter CF disposed on the second base substrate 121, and a light blocking film BM disposed at an area between adjacent pixels. The opposite substrate 120 may be divided into a display area DA and a non-display area NDA.

After that, a liquid crystal layer 130 including a plurality of liquid crystal molecules may be disposed between the array substrate 110 and the opposite substrate 120.

After the liquid crystal layer 130 is disposed, the array substrate 110 may be bonded to the opposite substrate 120. The array substrate 110 may be bonded to the opposite substrate 120 by a sealing pattern disposed in the non-display area NDA. The sealing pattern may be disposed to surround the display area DA. As a result, the array substrate 110 may be bonded to the opposite substrate 120 and the liquid crystal layer 130 may be prevented from leaking to the outside.

After bonding the array substrate 110 and the opposite substrate 120, the liquid crystal display panel 100 may be manufactured by supplying heat or light to the sealing pattern to harden the sealing pattern.

After that, the liquid crystal device may be manufactured by accommodating the liquid crystal display panel 100 in a housing 300 together with a backlight unit 200 and then combining a window 400 with the housing.

By way of summation and review, the TN, PVA, and ECB mode liquid crystal display devices may have a narrowing viewing angle due to a refractive anisotropy of liquid crystal molecule when a voltage is applied.

Thus, a liquid crystal display device of an in plane switching (IPS) mode and a liquid crystal display device of a plane to line switching (PLS) mode are being developed.

In the PLS mode, a common electrode and a pixel electrode with an insulating layer between them may be arranged at each pixel area to form a fringe electric field, and all of liquid crystal molecules filled between an upper substrate and a lower substrate operate in each pixel area to form a vertical electric field and a horizontal electric field, and thus an opening ratio and a penetration ratio are improved.

Therefore, in the PLS mode, a data line inputting an image signal into the pixel electrode, the common electrode, or the pixel electrode may be undesirably shorted by a foreign substance during a process.

The embodiments provide a liquid crystal display device that can help prevent a short between interconnections.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A liquid crystal display device, comprising:
    an array substrate;
    an opposite substrate facing the array substrate; and
    a liquid crystal layer between the array substrate and the opposite substrate,
    wherein the array substrate includes:
    a base substrate;
    a gate electrode and a gate line on the base substrate;
    a gate insulating layer covering the gate electrode, the gate insulating layer including a trench crossing the gate line;
    a semiconductor layer on the gate insulating layer, the semiconductor layer including:
        a channel area overlapping the gate electrode,
        a source area at one side of the channel area, and
        a drain area at another side of the channel area;
    a pixel electrode on the gate insulating layer and spaced apart from the semiconductor layer;
    a source electrode connected to the source area;
    a drain electrode connected to the drain area and the pixel electrode;
    a data line connected to the source electrode, the data line being inside the trench; and
    a common electrode insulated from the pixel electrode.

2. The liquid crystal display device of claim 1, wherein a thickness of the gate insulating layer is greater than a thickness of the data line.

3. The liquid crystal display device of claim 2, wherein a depth of the trench is greater than the thickness of the data line.

4. The liquid crystal display device of claim 1, wherein the common electrode includes a plurality of slits, the plurality of slits being parallel to the data line.

5. The liquid crystal display device of claim 1, further comprising a protection layer between the pixel electrode and the common electrode.

6. The liquid crystal display device of claim 1, wherein the opposite substrate further includes a color filter disposed on a surface thereof facing the array substrate.

7. A liquid crystal display device, comprising:
    an array substrate;
    an opposite substrate facing the array substrate; and
    a liquid crystal layer between the array substrate and the opposite substrate, wherein the array substrate includes:
    a gate line;
    a protection layer;
    a data line crossing the gate line;
    an insulating layer between the gate line and the data line;
    a pixel connected to the gate line and the data line, wherein:
        the insulating layer includes a trench parallel to the data line, the data line being inside the trench,
        the pixel includes a common electrode, and
        the data line and the common electrode are disposed on the insulating layer and are covered by the protection layer.

8. The liquid crystal display device of claim 7, wherein a thickness of the insulating layer is greater than a thickness of the data line.

9. The liquid crystal display device of claim 8, wherein a depth of the trench is greater than a thickness of the data line.

10. A method of manufacturing a liquid crystal display device, the method comprising:
    preparing an array substrate;
    preparing an opposite substrate; and
    disposing a liquid crystal layer between the array substrate and the opposite substrate,
    wherein preparing the array substrate includes:
    disposing a gate electrode and a gate line on a base substrate;
    forming a gate insulating layer such that the gate insulating layer covers the gate electrode and the gate line;
    forming a semiconductor layer such that a part of the semiconductor layer overlaps the gate electrode on the gate insulating layer;
    forming a pixel electrode such that the pixel electrode is spaced apart from the semiconductor layer;
    forming a trench crossing the gate line by patterning the gate insulating layer;
    forming a source electrode and a drain electrode such that the source electrode and the drain electrode are connected to the semiconductor layer;
    forming a data line such that the data line is connected to the source electrode and is inside the trench; and
    forming a common electrode such that the common electrode is insulated from the pixel electrode.

11. The method of claim 10, wherein a thickness of the gate insulating layer is greater than a thickness of the data line.

12. The method of claim 11, wherein a depth of the trench is greater than the thickness of the data line.

13. The method of claim 10, further comprising forming a protection layer between the pixel electrode and the common electrode.

14. The method of claim 10, wherein the common electrode includes a plurality of slits, the plurality of slits being parallel to the data line.

\* \* \* \* \*